Feb. 28, 1967   J. M. LUCAS ETAL   3,306,965
PROCESS FOR THE MANUFACTURE OF PARTS HAVING A
COMPLEX BORDER OF AN ELASTOMER MATERIAL
Filed April 21, 1964   3 Sheets-Sheet 1

INVENTORS
JEAN MARIE LUCAS
JEAN VERTUT

BY   Bacon & Thomas

ATTORNEYS

United States Patent Office 3,306,965
Patented Feb. 28, 1967

3,306,965
PROCESS FOR THE MANUFACTURE OF PARTS HAVING A COMPLEX BORDER OF AN ELASTOMER MATERIAL
Jean Marie Lucas and Jean Vertut, both of Paris, France, assignors to Commissariat à l'Energie Atomique, Paris, France
Filed Apr. 21, 1964, Ser. No. 361,486
Claims priority, application France, May 6, 1963, 933,843
3 Claims. (Cl. 264—303)

The present invention relates to a process for the manufacture of sealing members or joints having a complex border such as a thick beading or edge having multiple lips formed of an elastomer material of the latex type and in particular of natural or synthetic rubber.

Sealing members which are made of a relatively flexible material and which are capable of providing suitable leak-tightness are already produced by a number of known methods. Those methods and processes which entail the use of molding techniques in their various forms deserve particular mention. Thus, in order to produce gloves or bellows-type seals which may be formed, for example, of polyvinyl chloride, and which are usually employed for the purpose of separating the outer atmosphere from the interior of a closed chamber such as a "glove box" for handling radioactive objects, a mold having suitable shapes and dimensions is employed for the purpose of forming around the edge of the aforesaid gloves or bellows-type seals a thick beading which serves to secure these latter to the chamber wall while at the same time performing the function of a leak-tight seal with said wall.

However, it is generally acknowledged that economy of operation cannot be satisfactorily achieved by the same molding process when the material employed is intended to be formed of an elastomer such as a latex of rubber, especially on account of its higher mechanical strength and its greater elasticity. In such cases, preference is accordingly given to the dipping method which consists in dipping a pattern or former which has previously been coated with a coagulating product in an emulsion of latex of either natural or synthetic rubber. When this former is withdrawn from the bath in which it has been dipped, a thin gelified film remains on this latter and subsequently forms the rubber component to be obtained, after suitable heating and vulcanization. It is known, however, that latex is usually presented in the form of a liquid which has low viscosity and which has a tendency to form foams. Latex is therefore unsuitable for the purpose of forming thick fillets or beads which are necessary, for example, in the case hereinabove specified, for the purpose of effecting the fixation and ensuring leak-tightness of gloves or bellows against the walls of an enclosed chamber.

The purpose of the present invention is to overcome the disadvantages noted above by virtue of an improvement made in the application of the aforesaid dipping method to the fabrication of latex components which are intended to have a certain thickness or to be endowed with complex shapes.

This process is mainly characterized in that it consists in dipping in an emulsion of elastomer material a mandrel provided with an annular channel which defines the shape of one of the faces of the border to be formed, in mounting on said mandrel a ring which forms an annular recess between the channel of said mandrel and the internal surface of said ring and which defines the shape of the other face of said border, said annular recess being intended to be completely filled with said emulsion.

A border or beaded edge is thus formed at the extremity of any elastic component. The dimensions of said border, and in particular the thickness thereof, can be variable as a function of the profile of the annular channel formed in the mandrel and also as a function of the profile of the ring which is adapted to cover said channel.

Moreover, the process in accordance with the invention permits the possibility of fabricating parts which have complex shapes and which are provided in particular with a number of lips. To this end, and in accordance with another characteristic feature, the process consists in forming at the same time a thin lip on the outer surface of the ring which is suitably machined for this purpose, the said lip being joined directly to the thick beading which is formed between the channel of the mandrel and the internal surface of the ring.

Apart from the main arrangements referred-to above, the process considered consists in certain secondary arrangements which will be more specifically referred-to below and which are especially concerned with the presence of radial ducts formed through the ring of the mandrel so as to permit the air which is contained in the annular recess to escape therefrom as and when said recess is filled with latex emulsion by capillarity. Said secondary arrangements are additionally concerned with certain particular shapes with which the ring and the mandrel channel are endowed for the purpose of obtaining special components having a profile which is governed by special conditions of utilization.

The invention is therefore concerned not only with the process as hereinabove defined but also with the various uses to which it may be applied and is directed in particular to the manufacture of beaded edges or lip-type joints for components such as elastic gloves or bellows as formed in the manner which has been specifically explained in the foregoing.

In any case, the invention will be more readily understood by consideration of the complementary description which now follows in reference to one particular example of operation of the process and to the application of the product obtained to the provision of a leak-tight coupling between a rigid wall and a detachable member which is intended to be mounted on said wall.

It is of interest to note in the first place that the dipping process is particularly useful for the purpose of carrying out the manufacture of a thin component of rubber having a practically constant thickness. It is in fact known that, at the time of immersion of a mandrel in a bath of latex, for example, there is formed on the wall of said mandrel a gelified coating of substantially constant thickness, said thickness being a function of the quantity of coagulant which has been previously deposited on the mold.

In the case of certain applications, it can prove necessary to strengthen the edges of elastic parts which are obtained by means of the conventional dipping process, either for the purpose of improving their tensile strength or for the purpose of ensuring leak-tightness around a cylindrical nozzle. In such cases, it is usually essential to provide these elastic parts with a beading which presents an appreciable overthickness and which, for the reasons stated above, cannot be produced by means of the usual method. Admittedly, it is possible in certain applications to roll down the edge of the elastic part so as to form this beading. However, if there remains in the interior of the beading even a very small quantity of coagulant, it is not possible to obtain suitable adhesion of the border itself. In order to circumvent this difficulty to form a uniform beading, it accordingly proves necessary to roll the gel beyond that zone of the mold which is coated with coagulant. However, this operation is particularly difficulty on account of the high fragility of the gel itself. Furthermore, it is never possible to form local overthicknesses, especially at the edge of any part, which are capable of conforming to precise geometric dimensions such as those which are made possible by the molding process.

Figure 1:
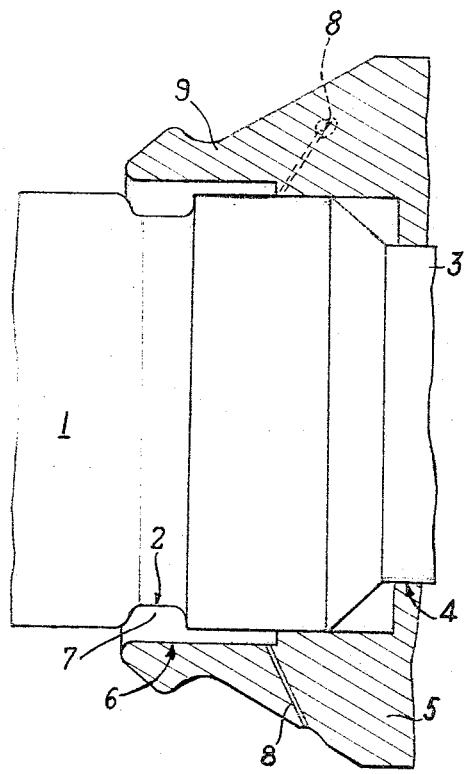
FIG. 1 is a diagrammatic sectional view of the device for the practical operation of the process according to the invention.

In accordance with the invention, the disadvantages noted above are overcome by virtue of the device which is illustrated diagrammatically in FIG. 1. This device is composed of a cylindrical mandrel 1 in which is machined a circular channel 2, the shape of which exactly corresponds to that of the intended shape of the beading to be formed on the rubber component. A portion of reduced cross-section or neck is formed at the end 3 of the mandrel 1 which is provided in the outer surface thereof with a cylindrical bearing surface 4 on which is slidably mounted an outer ring 5 which is adapted to cover the channel 2 externally thereof in such manner as to form between said channel and the internal surface 6 of this latter a circular recess 7. Radial ducts such as the duct 8 are formed through the ring 5 and provide a communication between the interior of the annular recess 7 and the external surface of said ring 5 to the rear of a portion 9 which forms part of this latter and the shape and function of which will be defined hereinafter.

The operation of the apparatus which has just been described is as follows: in a first step, the mandrel 1 and its ring 5 which has been previously mounted on said mandrel are immersed in a bath of coagulant, then allowed to drip, then dried in an oven and cooled. In a second step, the device is dipped in a bath or emulsion of latex. Owing to the presence of the ducts 8 which are formed in the ring 5, the liquid fills the annular recess 7 completely. After the coagulant has produced action, the mandrel and its ring are withdrawn from the bath, then again dried in an oven in such manner as to evacuate the residual water from the latex gel which has formed. The vulcanization of the layer of latex is then carried out.

In the following step, in order to permit the de-molding of the rubber part which is thus obtained, the ring 5 is accordingly freed by being caused to slide back to the rear, thereby releasing the outer portion of the rubber part from the interior of the annular recess 7 as well as from the exterior of the ring 5 on the portion 9 of this latter. There has in fact been deposited on the said portion 9 during the previous operations a thin coating of latex gel which is transformed into a thin elastic lip, said lip being joined directly to the thick beading which has formed between the circular channel 2 of the mandrel and the internal surface 6 of the ring 5.

Figure 2:
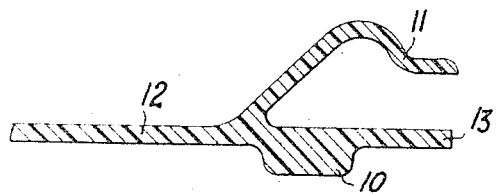
FIG. 2 is a partial sectional view of a sealing member formed of elastomer material by means of the device of FIG. 1.

The end of the rubber part thus produced has a complex shape as illustrated in FIG. 2. It can be seen from this figure that the rubber part which is generally designated by the reference 12 consists on the one hand of a thick fillet 10 having the shape of the annular recess 7 which is defined between the channel of the mandrel and the ring which is mounted on this latter and, on the other hand, of a thin lip 11 which is formed on the portion 9 of the ring and which is joined directly to the fillet 10. In addition, the aforesaid fillet 10 has an extension in the form of a collar or fin 13 which is formed in the bottom of the annular recess 7. Accordingly, the final step of the process consists in cutting off this fin flush with the fillet or beading 10. The thin lip 11 can also be cut off or retained depending on the particular applications which are contemplated for the utilization of the part 12 which has just been fabricated.

In the case, for example, in which the part is a glove or bellows-type seal designed to provide a leak-tight junction between a "glove box" and the outer atmosphere, it is known that it is necessary to secure the glove against the wall of the glove box or more exactly against a mounting element known as a glove ring or hand-hole bushing and at the same time to ensure leak-tightness between said mounting element and the wall of the glove box.

Thus, in French Patent No. 1,347,746 and in the corresponding U.S. patent application of Jean-Pierre Cazalis and Jean Vertut, Serial No. 320,640, filed November 1, 1963, assigned to Commissariat à l'Energie Atomique, a design of this type has already been described wherein the glove or elastic bellows employed is formed by molding a suitable material such as polyvinyl chloride.

Figure 3:
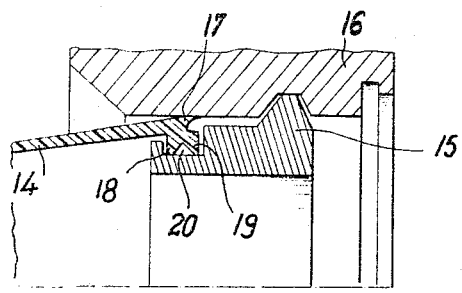
FIG. 3 is a diagrammatic vertical sectional view illustrating a particular application of a sealing joint having multiple lips.

FIG. 3 illustrates a particular arrangement of this type wherein the end of a glove 14 is intended to be securely held between a ring or hand-hole bushing 15 and the wall 16 of a glove box. To this end, the end of the glove is usefully provided with a number of lips which are designated by the reference numerals 17, 18 and 19 which permit the possibility on the one hand of securing the glove 14 in position within the ring 15 (by means of the lips 18 and 19) and, on the other hand, of ensuring leak-tightness of said glove in contact with the wall 16 (by means of the lip 17).

However, in the case in which the material employed is intended to be an elastomer of the latex type and not polyvinyl chloride, it is found that the above-mentioned lips 17, 18 and 19 cannot be formed by dipping. It will be noted that the invention nevertheless makes it possible to satisfy the requisite conditions of immovable fixation and leak-tightness on the one hand by virtue of the beading 10 and on the other hand by virtue of the thin lip 11 which is joined to said beading.

Figure 4:
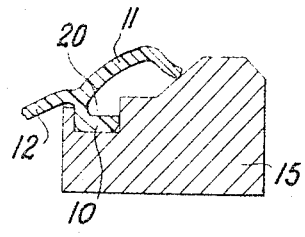
FIGS. 4 and 5 illustrate two successive stages of positioning of the sealing member shown in FIG. 2 at the time of an application which is similar to that of FIG. 3.
Figure 5:
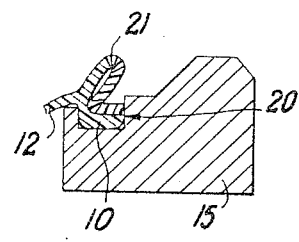
Figure 6:
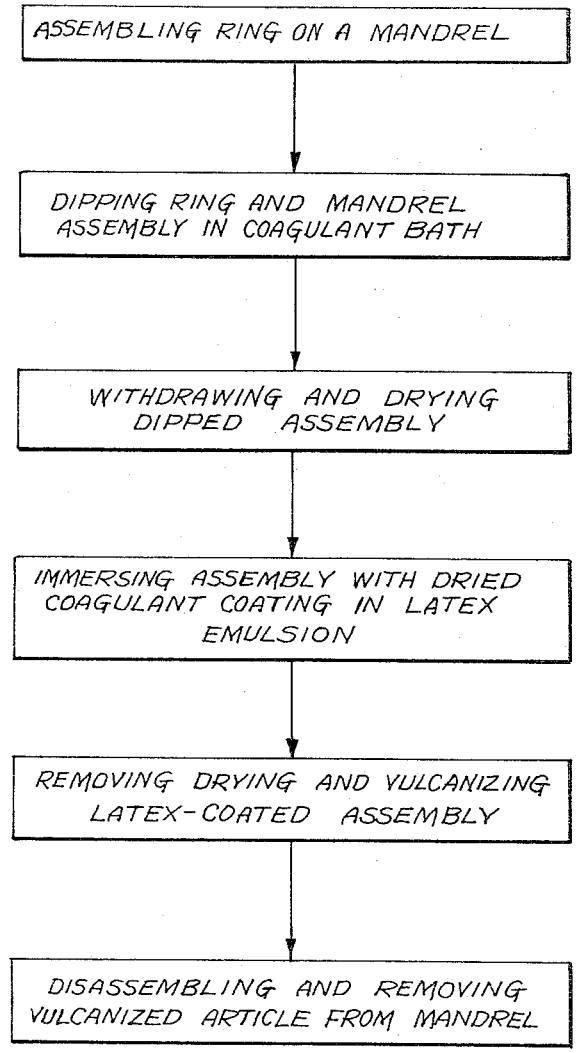
FIG. 6 is a flow diagram showing the steps of forming articles by the method of this invention.

FIGS. 4 and 5 illustrate the manner in which the part 12 is positioned between the ring 15 and the wall 16. The beading 10, the geometrical dimensions of which can have every requisite degree of accuracy, alone performs the same function as the two lips 18 and 19 referred-to above and is brought to bear against the bottom of the channel 20 of the ring 15, thus securing the part 12 in position. The lip 17 is in this case replaced by the thin lip 11 which is formed at the time of dipping and which is adapted to take up during the positioning thereof the successive positions shown in FIGS. 4 and 5 so as to form a fold 21 which is capable of bearing against the wall 16.

The result achieved by this design is similar to that achieved by the joints with molded lips which are already known, on the one hand by virtue of the tensile strength of the beading 10 which prevents this latter from escaping from its channel 20 and, on the other hand, by virtue of the flexibility of the fold 21 which enables the part 12 to be applied against the wall 16 with sufficient force to ensure leak-tightness.

It will be understood that the invention is not limited in any sense to the forms of embodiment which have been illustrated and described and which have been given solely by way of example.

What we claim is:

1. Process for the manufacture of parts having a complex border which is formed of an elastomer material, which comprises: mounting on a mandrel, provided with an annular channel which defines the shape of one of the faces of said border, a ring which forms an annular recess between the channel of said mandrel and the internal surface of said ring which defines the shape of the other face of said border; dipping said mandrel and said ring assembly in a bath comprising a coagulant; drying said assembly; immersing said assembly in a latex emulsion so as to permit the annular recess to be filled with the emulsion by capillarity by means of radial ducts formed through the ring disposed on the mandrel, said radial ducts being adapted to connect the internal face of said annular recess with the external face of said ring; removing said assembly from said latex emulsion; and drying and vulcanizing the assembly.

2. A process as a defined in claim 1, wherein the part is released from the mandrel by causing the ring to slide back to the rear of the apparatus and releasing the outer portion of the part from the interior of the annular recess.

3. A process for the manufacture of articles, formed of an elastomer material having a generally tubular portion terminating in an inwardly extending thick beading and an outwardly extending, annular lip, comprising: mounting on a mandrel, provided with an annular channel which defines the shape of the inwardly extending thick beading, a ring having an outer surface at one end thereof which defines the shape of the outwardly extending, annular lip and which forms an annular recess between the channel of said mandrel and the internal surface of said ring which defines the shape of the terminal end of said tubular portion; dipping said mandrel and said ring assembly into a liquid coagulant; drying the coagulant coating on said mandrel and ring assembly; immersing said coated mandrel and said one end of said ring downwardly into a latex emulsion to a depth sufficient to coat with said latex emulsion the outer surface of the immersed portion of the mandrel and said shaped outer surface portion of said ring, thus forming said tubular portion and said annular lip, and to fill said annular recess and said channel with the emulsion by capillarity, thus forming said thick beading, while venting said annular recess to the exterior of said ring through ducts formed in said ring connecting the internal face of said annular recess with the external face of said ring; permitting the coagulant and the emulsion to form a latex gel on said assembly; removing said assembly and adhering latex gel from said latex emulsion; drying and vulcanizing said latex gel on said assembly; sliding said ring to the rear of said mandrel uncovering said channel and releasing the outer portion of the article from the interior of the annular recess; and removing the vulcanized article from the mandrel.

References Cited by the Examiner

UNITED STATES PATENTS

| | | | |
|---|---|---|---|
| 1,951,402 | 3/1934 | Gammeter | 264—303 |
| 2,337,116 | 12/1943 | Limbert | 264—303 |
| 2,786,238 | 3/1957 | Shapero | 264—303 |
| 3,134,831 | 5/1964 | De Fusco | 264—303 |

FOREIGN PATENTS 1,347,746  11/1963  France.

ROBERT F. WHITE, *Primary Examiner.*

ALEXANDER H. BRODMERKEL, *Examiner.*

R. B. MOFFITT, *Assistant Examiner.*